Aug. 16, 1960 H. L. PHILIPPE 2,949,244
AIR NOZZLE ADAPTER
Filed Sept. 5, 1957

INVENTOR.
Howard L. Philippe,
BY
Alexander, Hofgren,
Brady & Wegner Attys.

United States Patent Office 2,949,244
Patented Aug. 16, 1960

2,949,244

AIR NOZZLE ADAPTER

Howard L. Philippe, Chicago, Ill., assignor to The Imperial Brass Manufacturing Company, a corporation of Illinois Filed Sept. 5, 1957, Ser. No. 682,130

2 Claims. (Cl. 239—589)

This invention relates to an air valve and in particular to a nozzle-type air valve.

Nozzle-type air valves are conventionally used to deliver air under pressure into a circumambient space in the form of a discharge stream. It has been found desirable at times to utilize the nozzle valve to deliver the air to within another element by sealingly connecting the outlet means of the valve to suitable means on the other element.

The principal object of this invention is to provide a nozzle having new and improved outlet means.

Another object is to provide such a nozzle having outlet means arranged alternatively for discharge of pressurized air freely into the circumambient space and to have sealed communication with another element to deliver air under pressure thereinto.

A further object of the invention is to provide such a nozzle having means for automatically effecting the opening of a valve element associated with the other element when the nozzle is placed in air-delivering association with the other element.

Other features and advantages of this invention will be apparent from the following description taken in connection with the accompanying drawings wherein.

Figure 1:
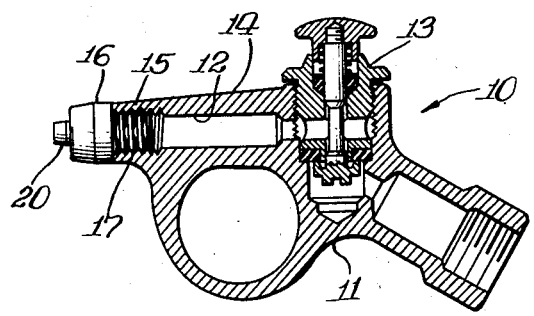
Figure 1 is a view partly in longitudinal, diametric section and partly in elevation of an air valve embodying the invention.

In the exemplary embodiment of the invention as disclosed in the drawings, an air valve generally designated 10, is shown to comprise a body 11 having an air passage 12 therethrough. To control the flow of air through passage 12, a valve 13 is provided. Valve 13 may be of any suitable, manually operable construction well-known in the art and no further description need be given here. The portion of body 11 downstream of valve 13 comprises a nozzle 14 terminating in an outlet 15. An adapter generally designated 16 is secured to nozzle outlet 15 to extend outwardly therefrom and to define an extension thereof.

Figure 2:
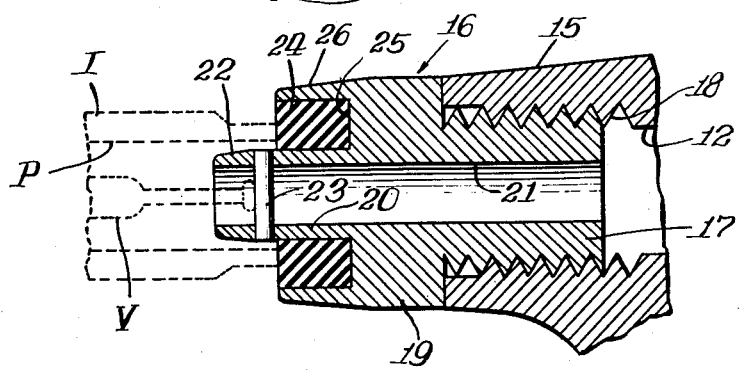
Figure 2 is an enlarged, fragmentary longitudinal section thereof, showing an associated air receiving element in dotted lines.

As best seen in Figure 2, adapter 16 may be secured to outlet 15 by means of an exteriorly threaded, annular connecting portion 17 engaging an interiorly threaded portion 18 of the outlet. Connecting portion 17 extends longitudinally inwardly from a body portion 19 of the adapter. Extending longitudinally outwardly from body portion 19, oppositely to connecting portion 17, is a central thin-walled tubular projection 20. A bore 21 extends continuously through connecting portion 17, body portion 19, and projection 20 to define a continuation of passage 12. The radially outer end 22 of projection 20 may be tapered so as to narrow longitudinally away from outlet 15, for facilitating insertion of end 22 into a passage P of the tubular inlet I of an element such as a tire valve device as shown in dotted lines in Figure 2.

Figure 3:
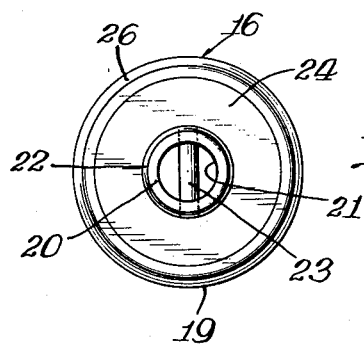
Figure 3 is an end view of the nozzle.

Means may be provided in bore 21 for limiting the insertion of an axial valve element V of the tire valve device into bore 21 to effect a relative movement between valve V and tubular inlet I thereby to open the tire valve. As best seen in Figures 2 and 3 of the drawing, these means comprise a pin 23 secured to projection 20 to extend transversely across bore 21 therein.

To seal valve inlet I to adapter 16, and resultingly to nozzle outlet 15, concurrently with the opening of valve V by pin 23, a sealing ring 24 formed of a resilient material such as rubber is disposed in an annular space 25 between projection 20 and a concentric, radially outwardly spaced annular flange 26 on body portion 19. The longitudinal extent of sealing ring 24 is correlated with the positioning of pin 23 so that valve inlet I is in positive sealing abutment with ring 24 whenever pin 23 effects an opening of valve V. As best seen in Figure 2, outer end 22 of projection 20 extends substantially longitudinally beyond sealing ring 24 and flange 26.

Flange 26 is tapered narrowing away from outlet 15, to facilitate insertion, when desired, of the adapter into elements having large inlet openings.

When it is desired to utilize air valve 10 to deliver pressurized air to the circumambient space, body 11 is positioned as desired and valve 13 is manipulated to permit the passage of pressurized air from a suitable pressurized source (not shown) through passage 12 and outwardly through adapter 16. When it is desired to utilize air valve 10, to blow air into a space bounded by a wall having a relatively large opening therein, nozzle 14 is inserted through the opening by passing adapter 16 therethrough, the tapered end 26 of the adapter facilitating such insertion.

When it is desired to utilize air valve 10 to deliver pressurized air to an element such as an automobile tire having a conventional air valve, projection 22 of adapted 16 is inserted into the tubular inlet I of the air valve until inlet I sealingly abuts sealing ring 24 to connect the inlet and air valve 10. Pressurized air may then be admitted to the tire by manipulation of valve 13 to open passage 12. Concurrently, valve V of the tire valve device is held open by its abutment with pin 23 in adapter passage 21.

While I have shown and described one embodiment of my invention, it is to be understood that it is capable of many modifications. Changes, therefore, in the construction and arrangement may be made without departing from the spirit and scope of the invention as defined in the appended claims.

I claim:

1. Air delivering means comprising: a nozzle having an air passage therethrough opening through a tubular outlet; an adapter removably secured to said nozzle to extend from an outer end of said outlet and define an extension of said passage, the outer peripheral surface of said adapter forming an aligned continuation of the outer peripheral surface of said nozzle, an outer end provided with a central thin-walled tubular projection having its outer peripheral end surface narrowing away from the outlet, and a concentrically radially outwardly spaced annular flange defining radially between said tubular projection and said flange an annular space, the outer peripheral end surface of said flange being tapered to narrow away from the outlet; and a yieldable sealing ring in said space.

2. An adapter for use with an air nozzle, comprising: a rigid member defining an air passage, and having an outer end provided with a central thin-walled tubular projection having its outer peripheral end surface narrowing away from the opposite end of the adapter, and a concentrically radially outwardly spaced annular flange defining radially between said tubular projection and said flange an annular space, the outer peripheral end surface of said flange being tapered to narrow away from said opposite end of the adapter; and a yieldable sealing ring in said space.

References Cited in the file of this patent

UNITED STATES PATENTS

| | | |
|---|---|---|
| 1,312,457 | Schweinert | Aug. 5, 1919 |
| 1,507,754 | McAneny | Sept. 9, 1924 |
| 1,751,114 | Walstrom | Mar. 18, 1930 |
| 1,781,121 | McFarland | Nov. 11, 1930 |
| 1,798,213 | Lyman | Mar. 31, 1931 |
| 2,104,904 | Morrow | Jan. 11, 1938 |
| 2,190,357 | Ginter | Feb. 13, 1940 |

FOREIGN PATENTS

| | | |
|---|---|---|
| 767,850 | Germany | Feb. 1, 1954 |